United States Patent
Yan et al.

(10) Patent No.: US 10,535,964 B1
(45) Date of Patent: Jan. 14, 2020

(54) POWER CABLE ADAPTOR

(71) Applicant: Amphenol Fiber Optic Technology (Shenzhen) Co., Ltd., Shenzhen (CN)

(72) Inventors: Jun-Bei Yan, Shenzhen (CN); Xing-Fu Mo, Shenzhen (CN); Anh Nguyen, Shenzhen (CN)

(73) Assignee: Amphenol Fiber Optic Technology (Shenzhen) Co., Lt, Shenzhen (CN)

( * ) Notice: Subject to any disclaimer, the term of this patent is extended or adjusted under 35 U.S.C. 154(b) by 0 days.

(21) Appl. No.: 16/292,397

(22) Filed: Mar. 5, 2019

(30) Foreign Application Priority Data

Oct. 25, 2018 (TW) .............................. 107214483 U

(51) Int. Cl.
*H01R 31/06* (2006.01)
*H01R 13/424* (2006.01)
*H01R 13/622* (2006.01)

(52) U.S. Cl.
CPC .......... *H01R 31/06* (2013.01); *H01R 13/424* (2013.01); *H01R 13/622* (2013.01)

(58) Field of Classification Search
CPC ..... H01R 31/06; H01R 13/424; H01R 13/622
USPC ................................................. 439/365, 638
See application file for complete search history.

(56) References Cited

U.S. PATENT DOCUMENTS

| | | | | |
|---|---|---|---|---|
| 3,885,849 A * | 5/1975 | Bailey | ................. | H01R 13/506 439/518 |
| 5,217,391 A * | 6/1993 | Fisher, Jr. | ............... | H01R 24/44 439/578 |
| 5,362,258 A * | 11/1994 | Arnswald | ............ | H01R 13/521 439/271 |
| 6,280,229 B1 * | 8/2001 | Harting | ................ | H01R 4/2433 439/320 |
| 7,168,989 B2 * | 1/2007 | Faulkner | ............. | H01R 31/065 439/620.22 |
| 7,727,021 B2 * | 6/2010 | Haruna | ................. | H01R 9/037 439/607.41 |
| 7,824,204 B2 * | 11/2010 | Fujiwara | ............ | H01R 13/5219 439/311 |
| 7,850,472 B2 * | 12/2010 | Friedrich | ............. | H01R 13/506 439/256 |
| 8,951,248 B2 * | 2/2015 | Messerly | ........... | A61B 18/1206 606/34 |
| 9,203,182 B2 * | 12/2015 | Fawcett | ................. | H01R 13/53 |
| 10,128,613 B2 * | 11/2018 | Yang | .................... | H01R 13/631 |
| 2008/0194137 A1 * | 8/2008 | Kuo | .................... | H01R 13/5205 439/489 |
| 2011/0147081 A1 * | 6/2011 | Best | ...................... | H02G 3/0633 174/84 R |

\* cited by examiner

*Primary Examiner* — Harshad C Patel
(74) *Attorney, Agent, or Firm* — Thomas | Horstemeyer, LLP

(57) ABSTRACT

A power cable adaptor includes a casing that has a receiving space, a retaining sleeve disposed in the casing and conductive members disposed within the retaining sleeve. The conductive members respectively define conductive channels. A cap is detachably connected to the casing and covers the receiving space. A wire dispenser is detachably received in the receiving space. The cap has an opening communicating with the conductive channels through the receiving space. The wire dispenser has wire passages communicating with the conductive channels and the opening of the cap.

5 Claims, 8 Drawing Sheets

POWER CABLE ADAPTOR

CROSS-REFERENCE TO RELATED APPLICATION

This application claims priority to Taiwanese Patent Application No. 107214483, filed on Oct. 25, 2018.

FIELD

The disclosure relates to an adaptor, and more particularly to a power cable adaptor.

BACKGROUND

FIG. 1 shows a pipe 5 used in the prior art to interconnect a single conductor 9 to another single conductor 10. The conductors 9, 10 are respectively inserted from two opposite sides of the pipe 5 and contact against each other inside the pipe 5. Screws 6 are used to secure the conductors 9, 10 and contact screw 14 is used to electrically interconnect the conductors 9, 10.

In order to meet the requirement of modern communications systems, the number of conductor cables needed for communications applications has been increased. Therefore, there is a need to provide cable connectors/adaptors for electrical connection between different types of conductor cables.

SUMMARY

Therefore, an object of the disclosure is to provide a power cable adaptor that is capable of making electrical connection between different types of conductor cables, including single conductor cables and different types of multi-conductor cables.

According to the disclosure, a power cable adaptor includes a first connection unit and a second connection unit.

The first connection unit includes a casing that has two opposite open ends and at least one receiving space proximal to one of the open ends, a retaining sleeve disposed within the casing distally from both of the open ends, and a plurality of conductive members disposed within the retaining sleeve. The conductive members respectively define a plurality of conductive channels.

The second connection unit includes at least one cap that is detachably connected to one of the open ends of the casing and that covers the at least one receiving space, and at least one wire dispenser removably received in the at least one receiving space. The at least one cap has an opening communicating with the conductive channels through the at least one receiving space. The at least one wire dispenser has a plurality of wire passages communicating with the conductive channels and the opening of the at least one cap.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
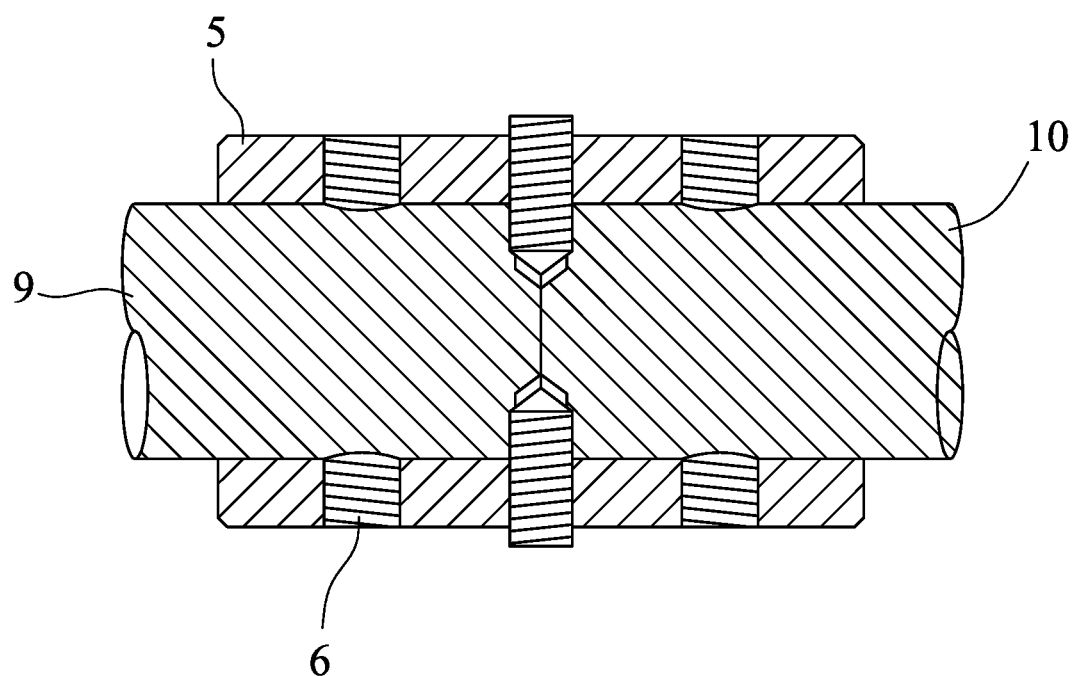
FIG. 1 is a perspective view illustrating a device for making an electrical connection in the prior art.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
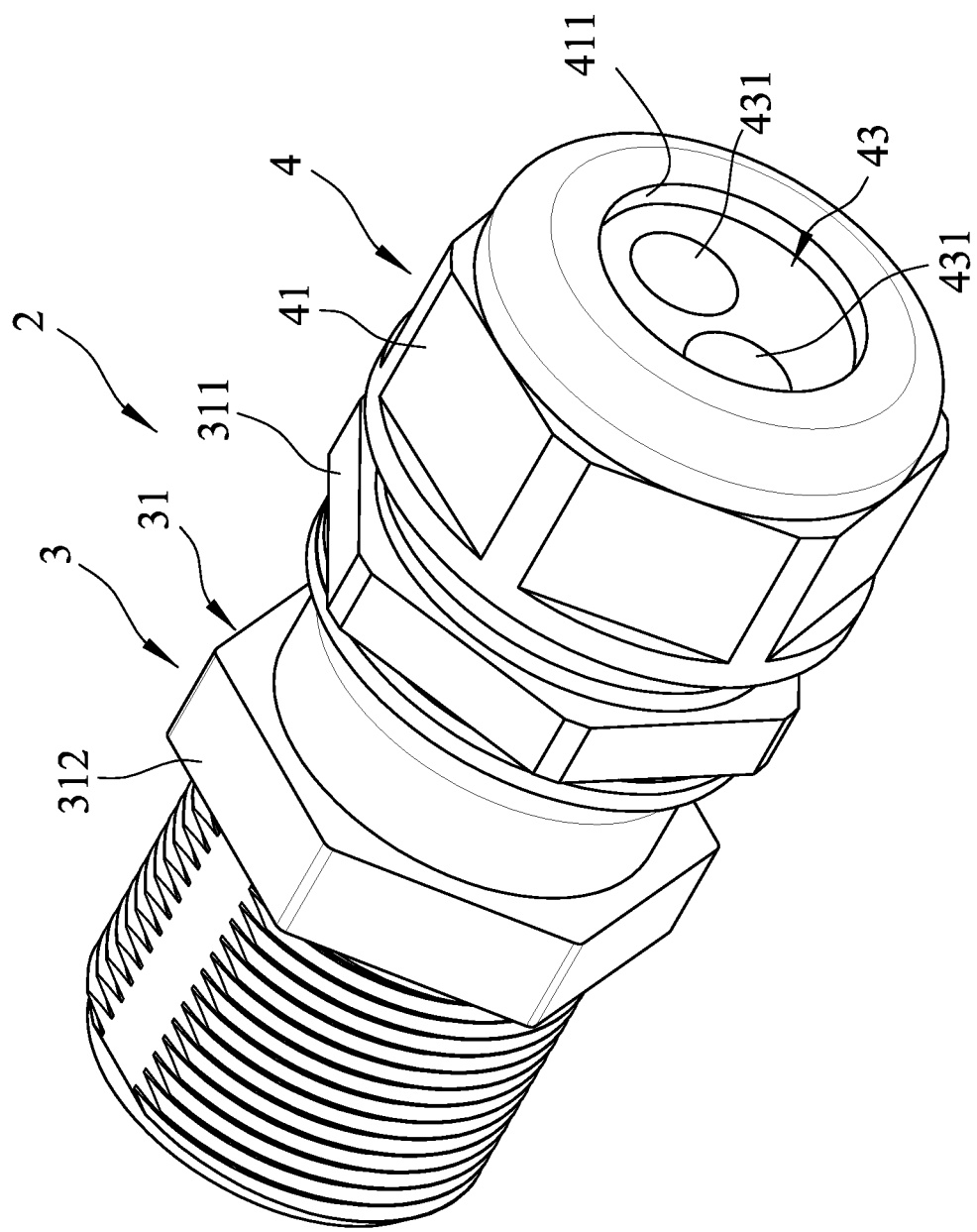
FIG. 2 is a perspective view of a first embodiment of a power cable adaptor according to the disclosure.
Figure 3:
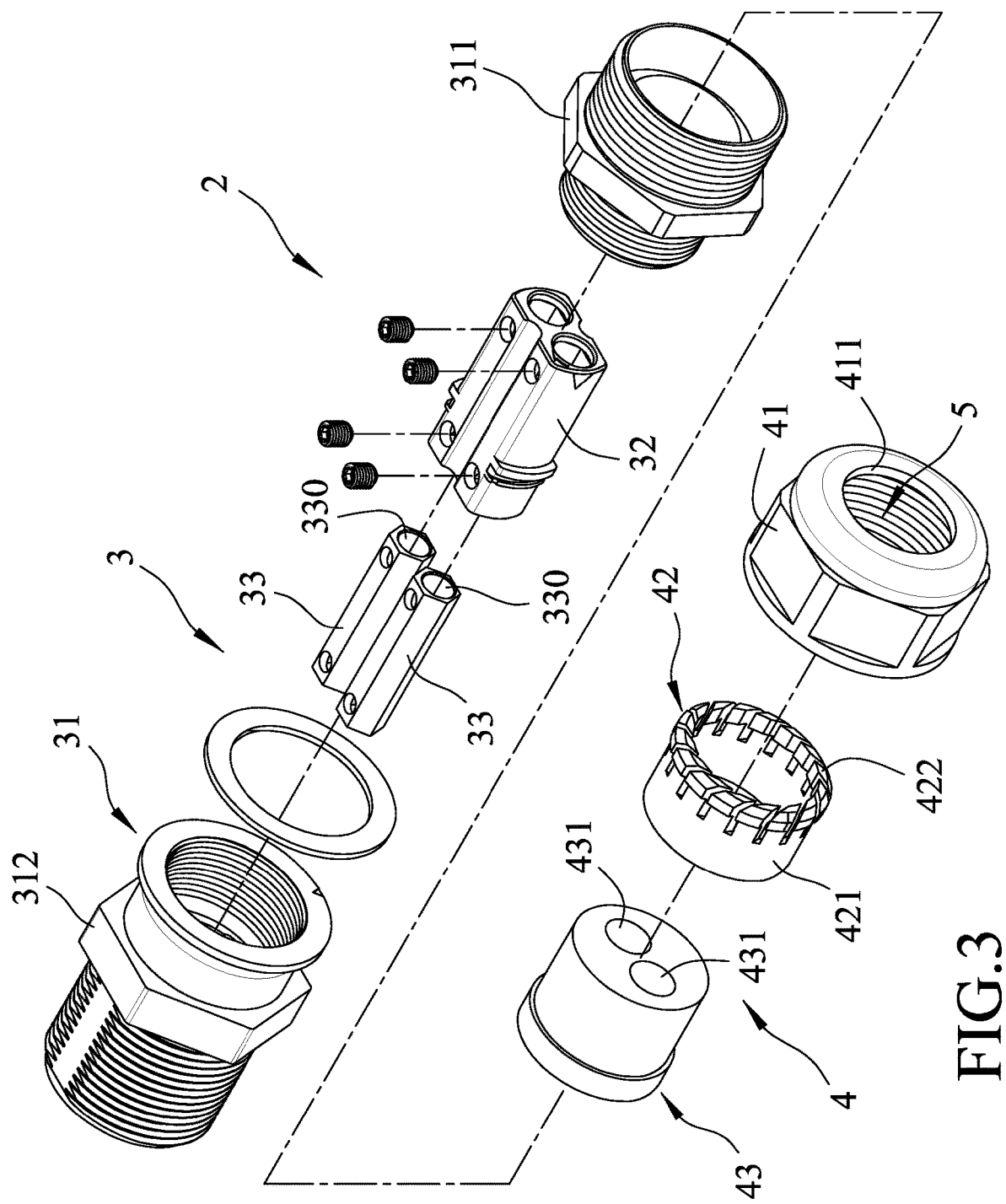
FIG. 3 is an exploded perspective view of the first embodiment.
Figure 4:
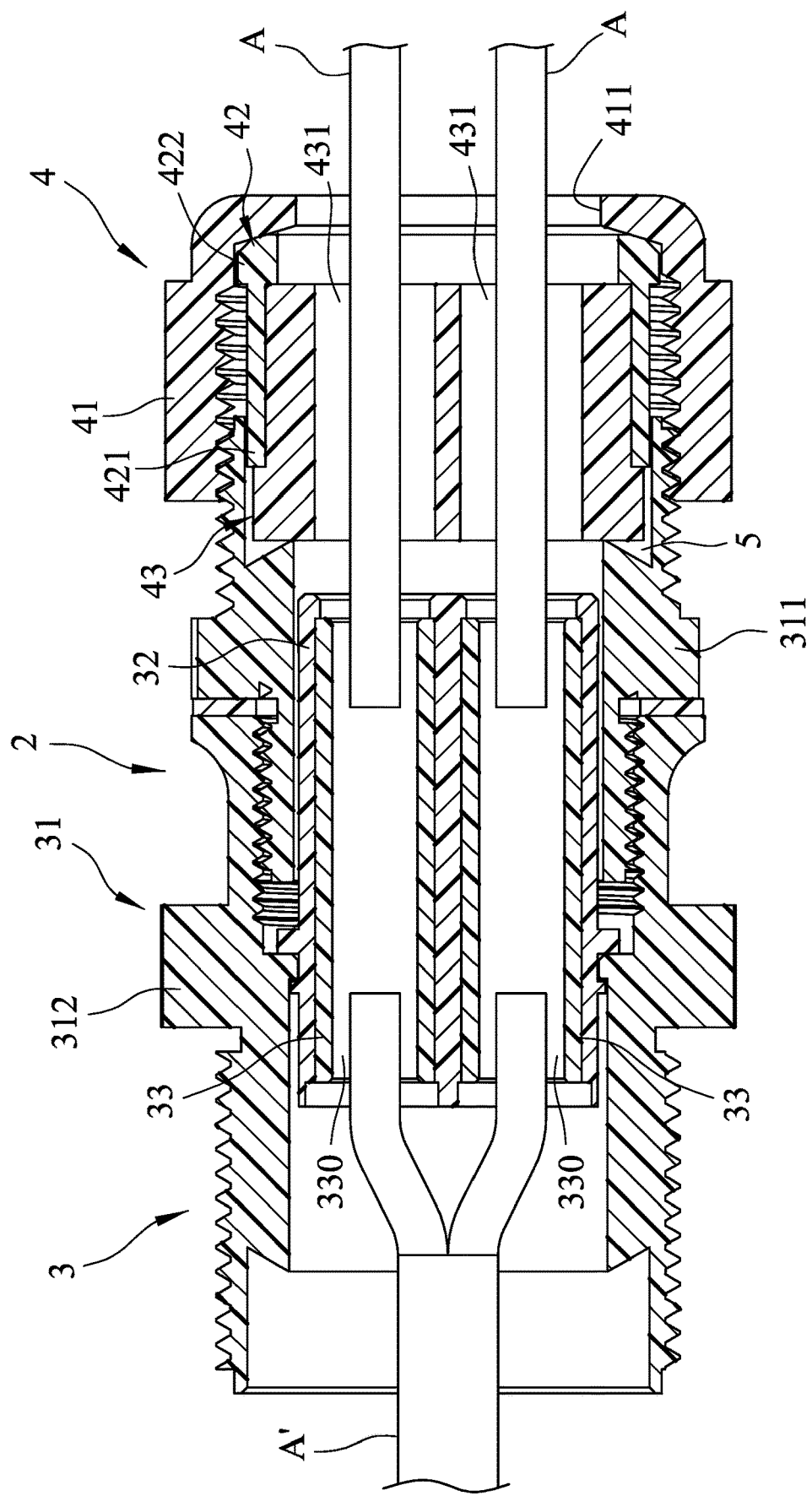
FIG. 4 is top sectional view of the first embodiment.

FIGS. 2 to 4 show a first embodiment of a power cable adaptor 2 according to the disclosure. The power cable adaptor 2 includes a first connection unit 3 and a second connection unit 4.

The first connection unit 3 includes a casing 31, a retaining sleeve 32 and two conductive members 33. The casing 31 has two opposite open ends and a receiving space 5 proximal to one of the open ends. In this embodiment, the casing 31 has a first casing portion 311 and a second casing portion 312 threadedly connected to the first casing portion 311. The two opposite open ends of the casing 31 are respectively formed on the first and second casing portions 311, 312. The retaining sleeve 32 is disposed within the casing 31 distally from both of the open ends of the casing 31. The conductive members 33 are removably disposed within the retaining sleeve 32. Each conductive member 33 defines a conductive channel 330, and is made from a conductive material. As shown in FIG. 4, the conductive channel 330 of each conductive member 33 has two opposite open ends. As shown in FIG. 4, two power cables (A) each have one conductor wire, and a power cable (A') has two conductor wires. One of the open ends of each conductive channel 330 permits insertion of the conductor wire of one of the power cables (A). The other open end of each conductive channel 330 permits insertion of one of the two conductor wires of the power cable (A'). The conductor wires of the power cables (A, A') are pressed by screws 6 (see FIG. 3) to abut against inner surfaces of the conductive members 33. Therefore, the power cables (A) are electrically connected to the power cable (A') by the conductive members 33.

The second connection unit 4 includes a cap 41, a limiting member 42 and a wire dispenser 43. The wire dispenser 43 is removably received in the receiving space 5. The cap 41 is detachably and threadedly connected to the first casing portion 311 of the casing 31, and covers the receiving space 5. The cap 41 has an opening 411 communicating with the conductive channels 330 of the conductive members 33 through the receiving space 5. The limiting member 42 is disposed within the receiving space 5, and partially extends outwardly from the first casing portion 311. The limiting member 42 has a surrounding wall portion 421 that surrounds the wire dispenser 43, and a stopping flanged end portion 422 that extends radially and inwardly from a periphery of the surrounding wall portion 421 and that is disposed between the cap 41 and the wire dispenser 43. The stopping flanged end portion 422 retains the wire dispenser 43 within the receiving space 5. The wire dispenser 43 has two wire passages 431 communicating with the conductive channels 330 and the opening 411 of the cap 41. The wire dispenser 43 is used for passage of the conductor wires of the power cables (A) which extend into the conductive channels 330 of the conductive members 33 through the wire passages 431, thereby electrically connecting to the conductive members 33, which in turn are respectively connected to the conductor wires of the power cable (A').

Referring once again to FIG. 4, the limiting member 42 and the wire dispenser 43 are not provided where the power cables (A') enters the power cable adaptor 2. The power cable adaptor 2 thus allows insertion of the power cable (A') at one side and insertion of the power cables (A) at the other side. By using the wire dispenser 43 which can be arranged to have variable number of wire passages 431, the power cable adaptor 2 can allow insertion of one or more power cables. As long as the number of the wire passages 431 of the wire dispenser 43 corresponds to that of the conductive channels 330 of the conductive members 33, the number of the wire passages 431 of the wire dispenser 43 and the conductive channels 330 of the conductive members 33 may be varied depending on the number of power cables to be inserted. Because the power cable adaptor 2 is modularized, it has a relatively wide range of utility.

Figure 5:
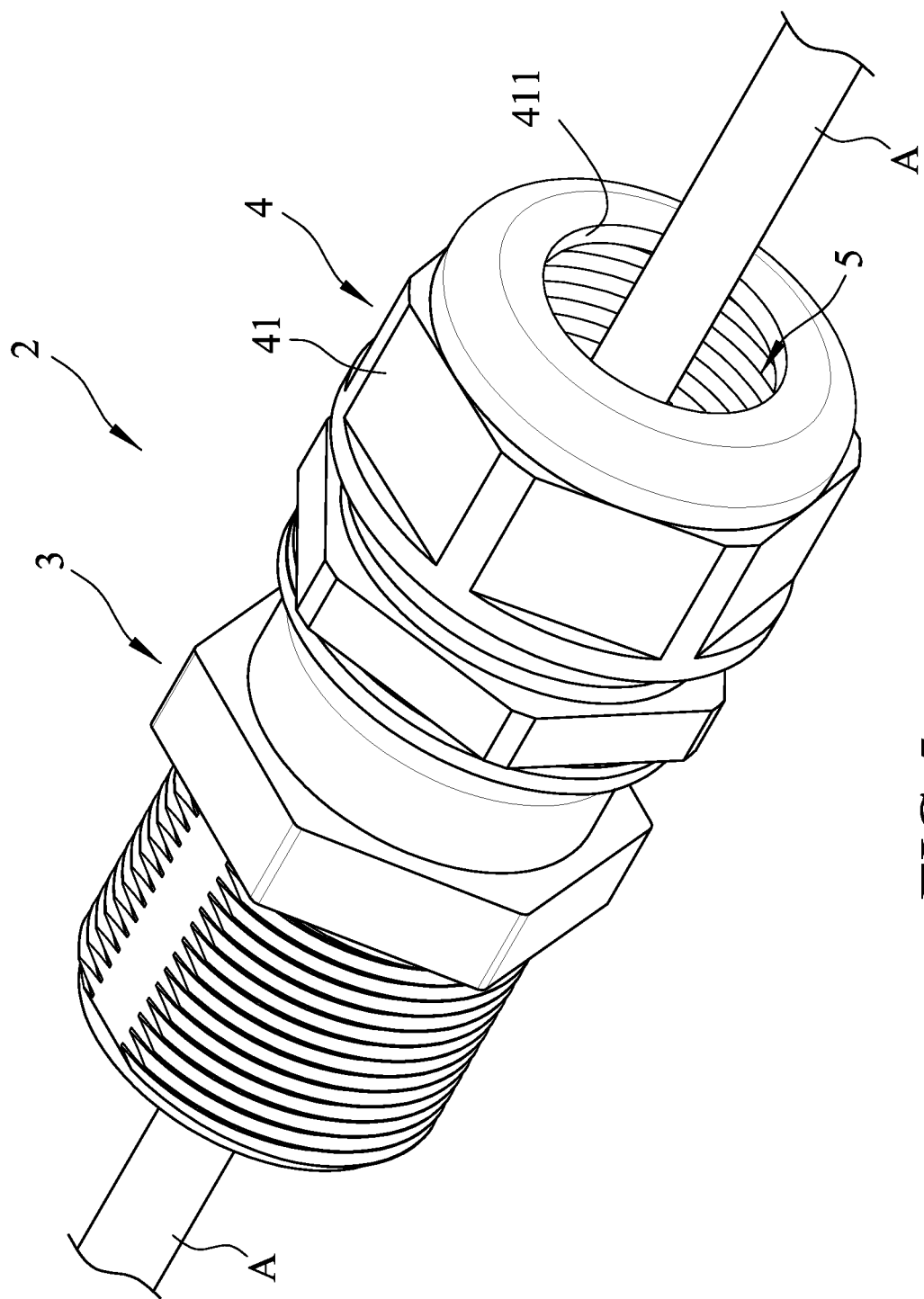
FIG. 5 is a perspective view of the first embodiment, illustrating that a limiting member and a wire dispenser of the power cable adaptor are removed for use in a different way.

FIG. 5 shows that, when the wire dispenser 43 is removed from the casing 31, one power cable (A) can be electrically connected to another one power cable (A).

Figure 6:
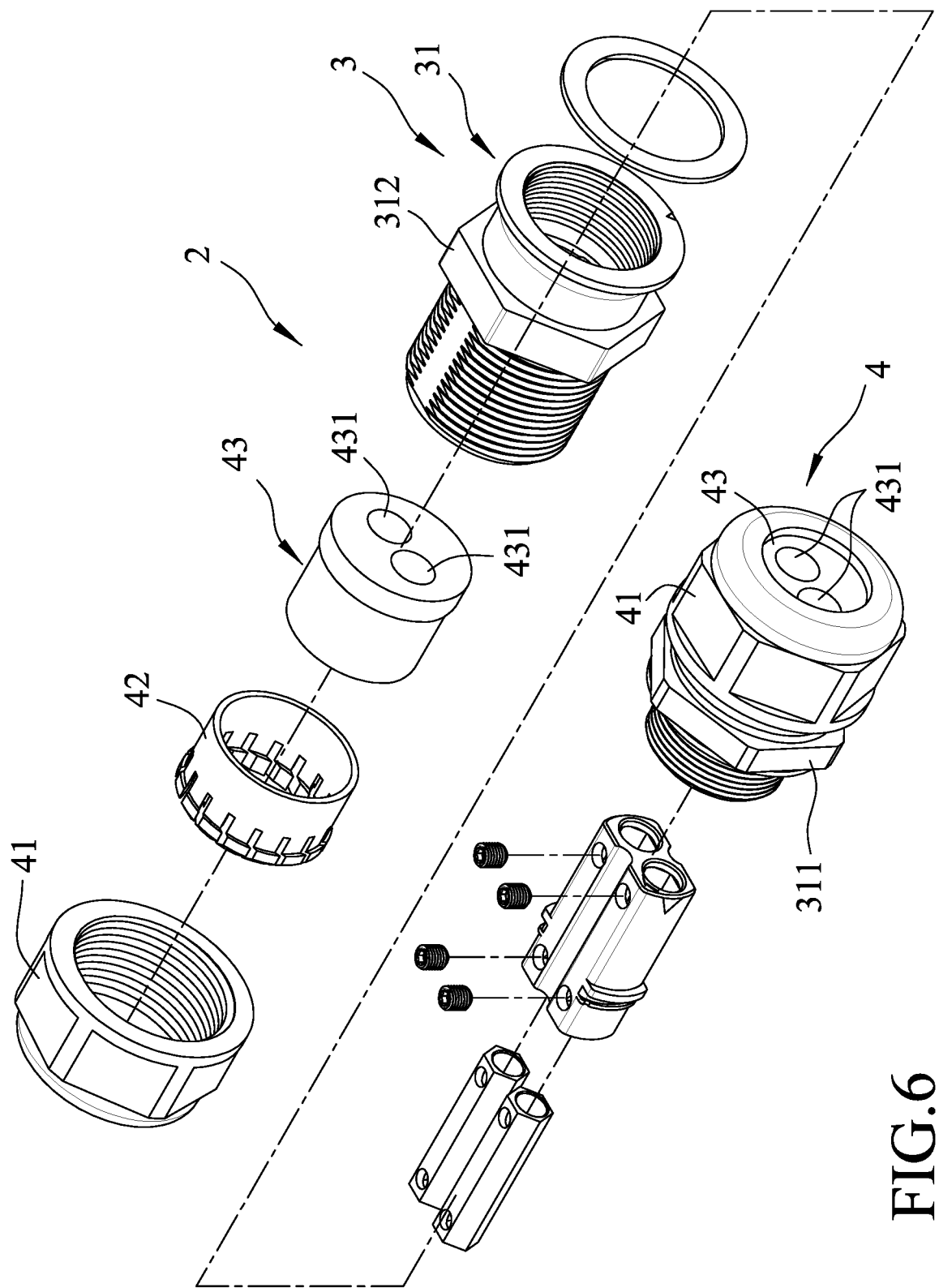
FIG. 6 is an exploded perspective view of a second embodiment of a power cable adaptor according to the disclosure.
Figure 7:
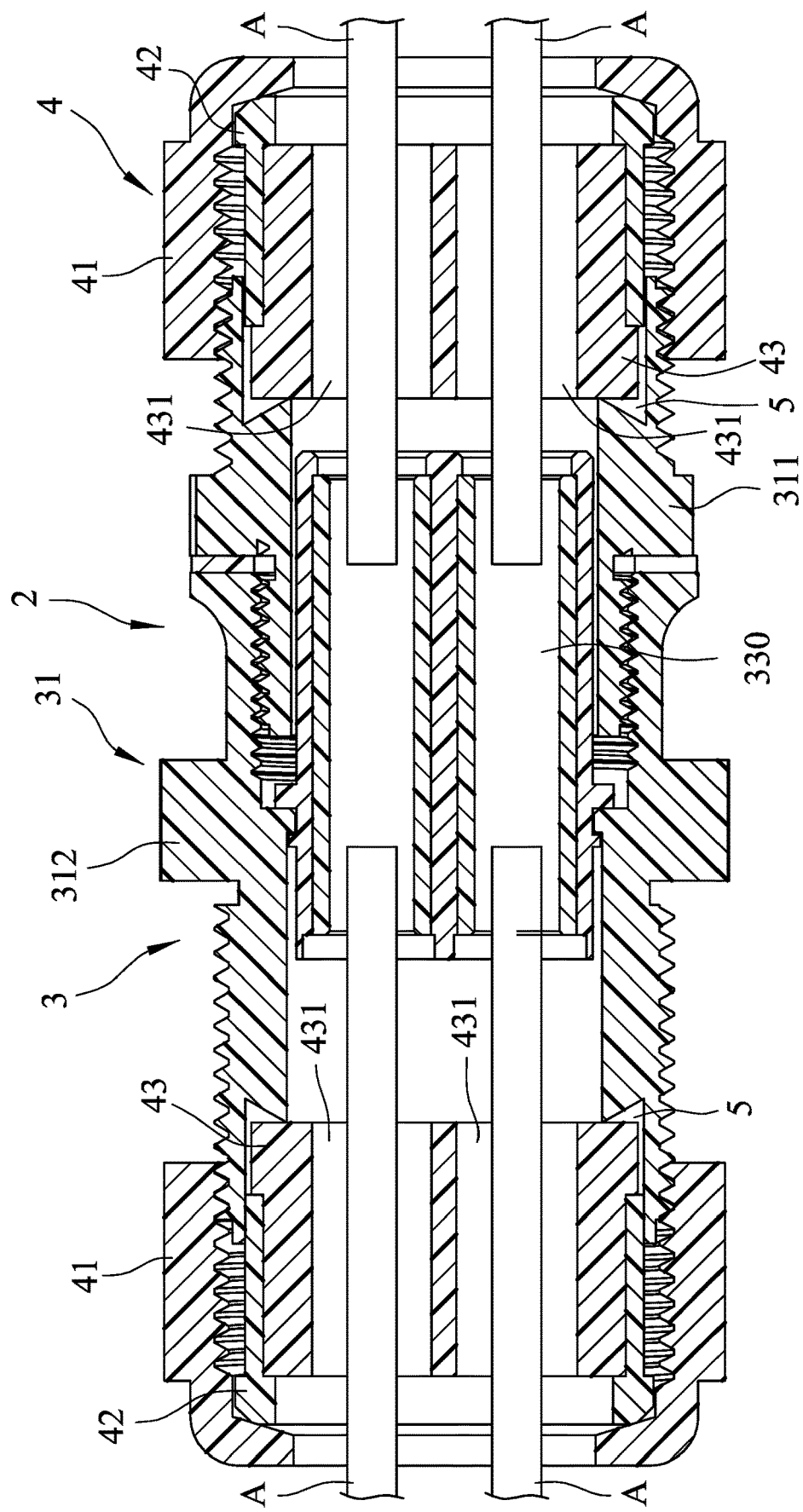
FIG. 7 is a top sectional view of the second embodiment.
Figure 8:
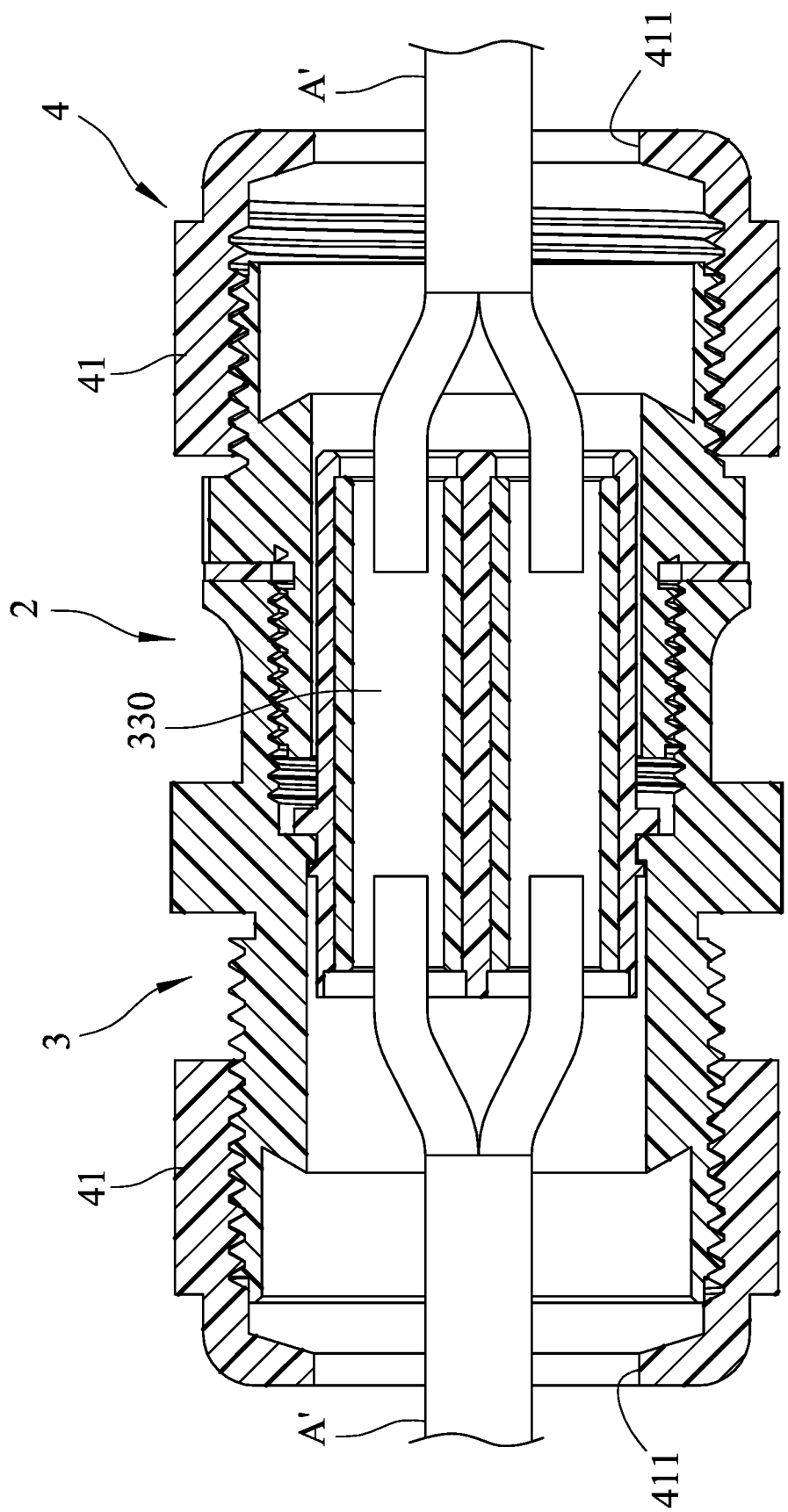
FIG. 8 is a top sectional view of the second embodiment used in a different way.

FIGS. 6 to 8 show a second embodiment of a power cable adaptor 2 according to the disclosure, which has a general structure similar to that of the first embodiment. However, in this embodiment, the casing 31 has two receiving spaces 5. The second connection unit 4 includes two caps 41 respectively and detachably connected to the open ends of the casing 31, two limiting members 42 respectively disposed in the two receiving spaces 5, and two wire dispensers 43 respectively received in the receiving spaces 5. The conductive members 33 are disposed between the two wire dispensers 43. The caps 41 respectively cover the receiving space 5. Each limiting member 42 has the surrounding wall portion 421 that surrounds one of the wire dispensers 43, and the stopping flanged end portion 422 that is disposed between one of the wire dispensers 43 and a corresponding one of the caps 41. As shown in FIG. 7, two power cables (A) are respectively and electrically connected to another two power cables (A) by the power cable adaptor 2. Based on the number of the power cables needed to be interconnected, the wire dispensers 43 and the conductive member 33 can be replaced to change the number of the wire passages 431 and the conductive channels 330.

FIG. 8 shows that, when the wire dispensers 43 are removed from the casing 31, one power cable (A') can be electrically connected to another one power cable (A').

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A power cable adaptor, comprising:
   a first connection unit including a casing that has two opposite open ends and at least one receiving space proximal to one of said open ends, a retaining sleeve disposed within said casing distally from both of said open ends, and a plurality of conductive members disposed within said retaining sleeve, said conductive members respectively defining a plurality of conductive channels; and
   a second connection unit including at least one cap that is detachably connected to one of said open ends of said casing and that covers said at least one receiving space, and at least one wire dispenser detachably received in said at least one receiving space, said at least one cap having an opening communicating with said conductive channels through said at least one receiving space, said at least one wire dispenser having a plurality of wire passages communicating with said conductive channels and said opening of said at least one cap.

2. The power cable adaptor as claimed in claim 1, wherein said at least one cap includes two caps respectively and detachably connected to said two opposite open ends of said casing, said at least one receiving space includes two receiving spaces respectively covered by said caps, said at least one wire dispenser including two wire dispensers respectively received in said receiving spaces, said conductive members being disposed between said two wire dispensers.

3. The power cable adaptor as claimed in claim 2, wherein said casing has a first casing portion threadedly connected to one of said caps, and a second casing portion having two opposite ends respectively and threadedly connected to the other one of said caps and said first casing portion.

4. The power cable adaptor as claimed in claim 1, wherein said second connection unit further includes a limiting member that is disposed within said at least one receiving space to retain said at least one wire dispenser, said limiting member having a surrounding wall portion that surrounds said at least one wire dispenser, and a stopping flanged end portion that extends radially and inwardly from a periphery of said surrounding wall portion and that is disposed between said at least one cap and said at least one wire dispenser.

5. The power cable adaptor as claimed in claim 2, wherein said second connection unit further includes two limiting members that are respectively disposed in said two receiving spaces to respectively retain said wire dispensers, each of said limiting members having a surrounding wall portion that surrounds one of said wire dispensers, and a stopping flanged end portion that extends radially and inwardly from a periphery of said surrounding wall portion and that is disposed between said one of said wire dispensers and a corresponding one of said caps.

* * * * *